United States Patent [19]

Oxford

[11] Patent Number: 5,020,818
[45] Date of Patent: Jun. 4, 1991

[54] ALL-TERRAIN WHEELCHAIR

[76] Inventor: Stuart G. Oxford, 13616 N. 78th St., Omaha, Nebr. 68122

[21] Appl. No.: 439,612

[22] Filed: Nov. 20, 1989

Related U.S. Application Data

[63] Continuation-in-part of Ser. No. 263,417, Oct. 27, 1988, Pat. No. 4,892,323.

[51] Int. Cl.$^5$ .......................... A61G 5/02; B62M 1/16
[52] U.S. Cl. .................. 280/250.1; 280/253; 280/304.1; 280/DIG. 10
[58] Field of Search ............... 280/250.1, 304.1, 253, 280/DIG. 10; 180/907

[56] References Cited

U.S. PATENT DOCUMENTS

| | | | |
|---|---|---|---|
| 244,084 | 7/1881 | Steinly | 105/129 |
| 441,409 | 11/1890 | Hardy | 280/217 |
| 579,664 | 3/1897 | McConley | 280/272 |
| 654,986 | 7/1900 | Krueger | 280/250.1 |
| 790,853 | 5/1905 | Reddy | 105/129 |
| 913,625 | 2/1909 | David | 105/129 |
| 963,857 | 7/1910 | Broomhall | 254/323 |
| 1,270,104 | 6/1918 | Benton et al. | 180/7.5 |
| 2,592,023 | 4/1952 | Gleason | 180/907 |
| 3,042,131 | 7/1962 | Dovci | 280/272 |
| 3,301,574 | 1/1967 | Good | 280/211 |
| 3,309,110 | 3/1967 | Bulmer | 280/250.1 |
| 3,877,725 | 4/1975 | Barroza | 280/250.1 |
| 3,994,509 | 11/1976 | Schaeffer | 280/250.1 |
| 4,138,131 | 2/1979 | Sommer | 280/220 |
| 4,354,691 | 10/1982 | Saunders et al. | 280/250.1 |
| 4,545,593 | 10/1985 | Farnam | 280/250.1 |
| 4,558,878 | 12/1985 | Motrenec | 280/272 |
| 4,641,847 | 2/1987 | Busse | 280/250.1 |
| 4,682,784 | 7/1987 | Anderson | 280/250.1 |
| 4,732,402 | 3/1988 | Lambert | 280/250.1 |
| 4,754,825 | 7/1988 | Scheffer | 180/7.5 |

FOREIGN PATENT DOCUMENTS

| | | | |
|---|---|---|---|
| 3814818 | 10/1989 | Fed. Rep. of Germany | 280/250.1 |
| 863541 | 1/1941 | France | 280/253 |
| 23071 | 9/1907 | United Kingdom | |

OTHER PUBLICATIONS

Don Kreb's "Access to Recreation", pp. 8 & 16.

Primary Examiner—Mitchell J. Hill
Attorney, Agent, or Firm—Zarley, McKee, Thomte, Voorhees & Sease

[57] ABSTRACT

An all-terrain wheelchair comprising a frame having a pair of wheels rotatably mounted at each side thereof with a seat mounted on the frame between the wheels. Each pair of the wheels is operatively interconnected so that rotation of one wheel of the pair of wheels will cause both wheels to rotate. A ratchet arm is operatively connected to each of the front wheels so that the operator may propel the wheelchair. An optional flexible track is also provide for each pair of wheels.

8 Claims, 4 Drawing Sheets 5,020,818

ALL-TERRAIN WHEELCHAIR

CROSS REFERENCE TO RELATED APPLICATION

This is a continuation-in-part application of the application entitled "ALL-TERRAIN WHEELCHAIR" filed on Oct. 27, 1988, under Ser. No. 07/263,417 issued as U.S. Pat. No. 4,892,323 on Jan. 9, 1990.

TECHNICAL FIELD

This invention relates generally to wheelchairs and more specifically to a wheelchair which may be utilized on all types of terrain.

BACKGROUND OF THE INVENTION

The conventional wheelchair is comprised of two large diameter, ground engaging, narrow width, pneumatic rear wheels mounted on an axle positioned beneath the seat portion of the chair with smaller diameter, narrow width, pneumatic, ground engaging wheels positioned forwardly of the rear wheels. The front wheels are pivotally mounted to vertical stanchions and generally are not able to be locked in any particular angular position. The occupant of the wheelchair is seated in a conventional fashion such that the lower portion of the occupant's legs will be generally perpendicular to the ground.

The operator of the conventional type wheelchair, when using the wheelchair off-road, is faced with a number of problems. The greatest problem is the instability caused by a high center of gravity. The wheelchair may topple over backwards when negotiating steep grades. When laterally traversing a steep incline, the wheelchair may tip sideways. Furthermore, when traversing downwardly, the occupant risks sliding out of the chair and/or having the chair become unbalanced and having the chair pitch forward.

The conventional wheelchair faces additional difficulties when traversing uneven surfaces or negotiating obstructions in the path. One difficulty is in being unable to proceed any further when a wheel becomes stuck in a depression, such that when the occupant attempts to free himself, the chair may be upset. A similar problem, with the same consequences, occurs when attempting to traverse obstructions—rocks, logs or curbs —in the pathway.

A further problem with the conventional wheelchair is that the user is unable to generate enough sustained human power to climb steep grades. If electric power is used, the battery and transmission make the wheelchair heavy and unwielding. Thus, the conventional wheelchair has limited capability for traversing inclines.

Another type of wheelchair is the sport model. Unlike the conventional model, the occupant's knees are bent upward such that the feet rest nearly in the same plane as the buttocks. The sport model wheelchair typically has a slightly longer wheel base, a slightly lower center of gravity and the hind wheels are slightly wider apart than the regular wheelchair. Sport wheelchairs may or may not have two front pneumatic ground engaging tires which have a tread width wider than the average rear pneumatic wheelchair tire. However, in the sport model, the outside diameter of the rear wheel is usually consistently as large as that of the regular wheelchair.

The sport wheelchair, however, faces problems similar to the conventional wheelchair when utilized off-road and in a steep incline situation. The sport model, while far more stable than the conventional wheelchair, still suffers problems in traversing a steep grade.

Both types of wheelchairs typically use narrow width pneumatic tires which are easily subject to puncture by branches, rocks and the like. When utilized in sandy, loose and unstable soil, the wheels sink and the occupant is stranded.

To lessen the puncture and traction problems several solutions have been propounded. One solution has been to mount an additional rear wheel to each side of the existing rear wheels, or to utilize a metal rear wheel. While the utilization of two adjacent wheels provides better traction, the puncture problem continues to exist and there are still some problems with sinking into soil. The metal wheel, while less likely to sink, lacks traction, and is incredibly uncomfortable for the user.

The wheelchair of the co-pending application represented a significant advance in the wheelchair art and solved many of the problems associated with the prior art wheelchairs. The wheelchair disclosed in the instant application is believed to be a significant improvement over the wheelchair described in the co-pending application.

It is therefore an object of the present invention to provide an improved all-terrain wheelchair.

Another object of the present invention is to provide a wheelchair which may be utilized on all types of terrain.

Another object of the present invention is to provide a wheelchair having a low center of gravity thereby increasing the stability thereof.

Still another object of the invention is to provide a wheelchair having a track means at each side thereof which provides the wheelchair with enhanced ability to traverse rough terrain, steps, etc.

Still another object of the invention is to provide a wheelchair of the type described which includes a ratchet arm means at each side thereof for propelling the wheelchair.

Still another object of the present invention is to provide an all-terrain wheelchair of the type described which is economical of manufacture, durable in use and refined in appearance.

These and other objects of the present invention will be apparent to those skilled in the art.

SUMMARY OF THE INVENTION

The all-terrain wheelchair of the present invention includes a frame having a pair of wheels rotatably mounted at each side thereof with a seat positioned on the frame between the pairs of wheels. A hand wheel or gripping wheel is operatively secured to each of the rear wheels to enable a person to grasp the same and to propel the wheelchair. A ratchet arm assembly is operatively connected to each of the front wheels to enable the user to propel the vehicle by that method, should the person so choose. An optional track may be mounted on each pair of wheels to permit the vehicle to traverse rough terrain, steps, etc.

DESCRIPTION OF THE PREFERRED EMBODIMENT

Figure 1:
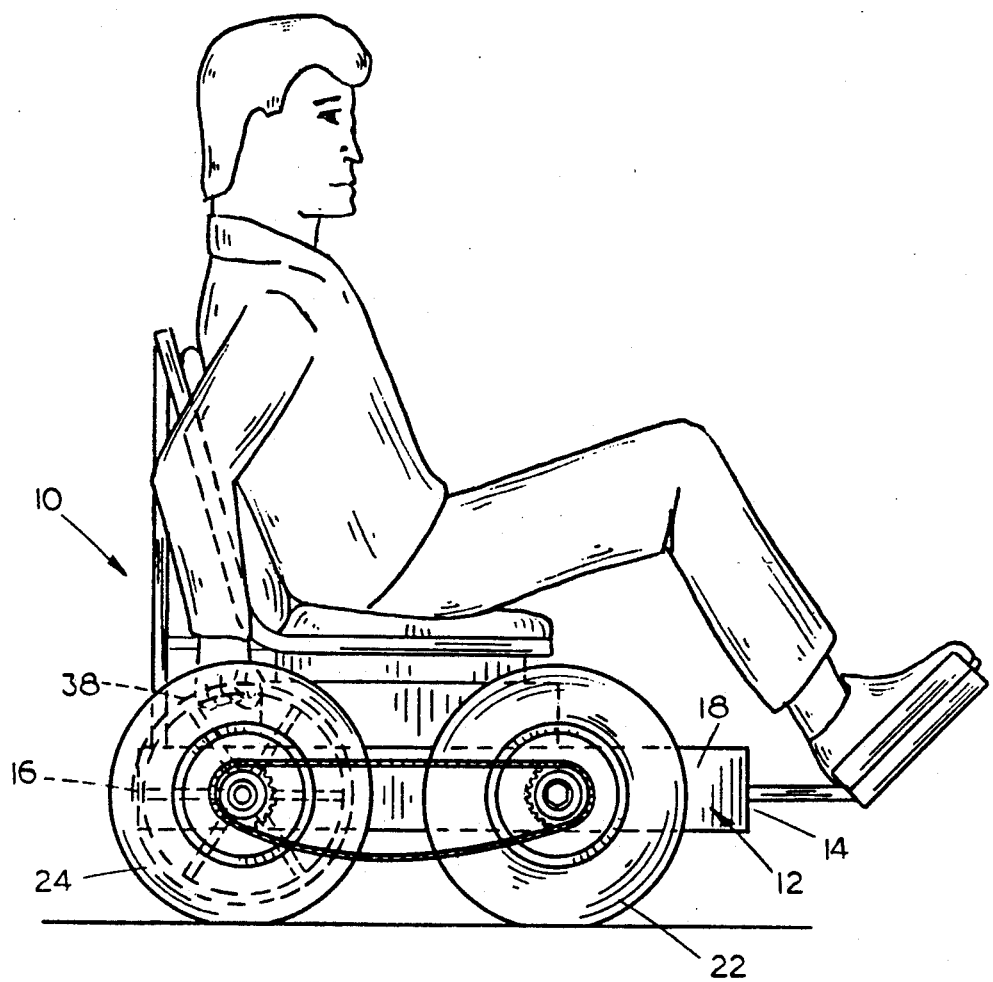
FIG. 1 is a side elevational view of the wheelchair of this invention.
Figure 2:
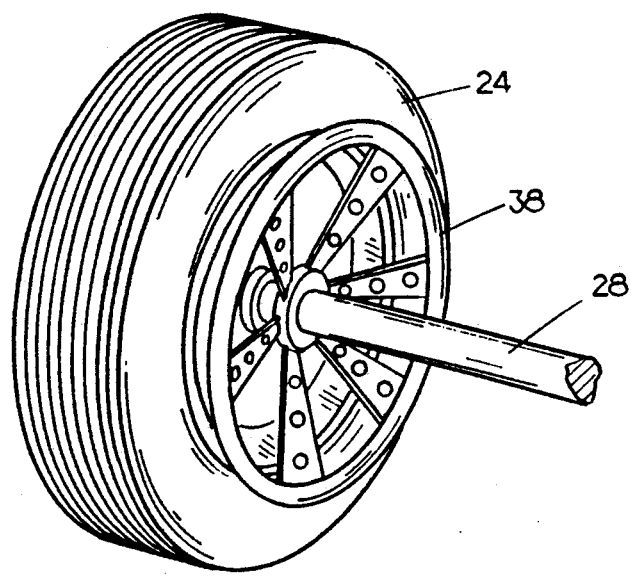
FIG. 2 is a perspective view of one of the rear wheels having the hand wheel associated therewith.
Figure 3:
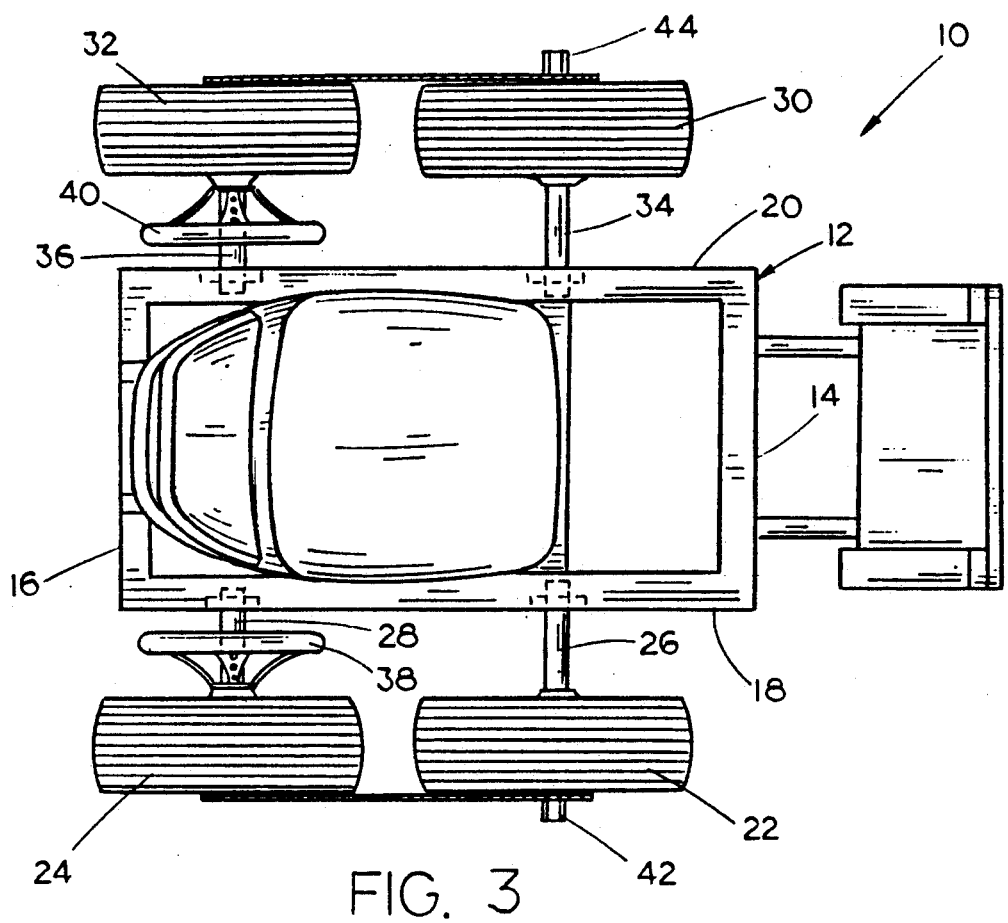
FIG. 3 is a top elevational view of the wheelchair.
Figure 4:
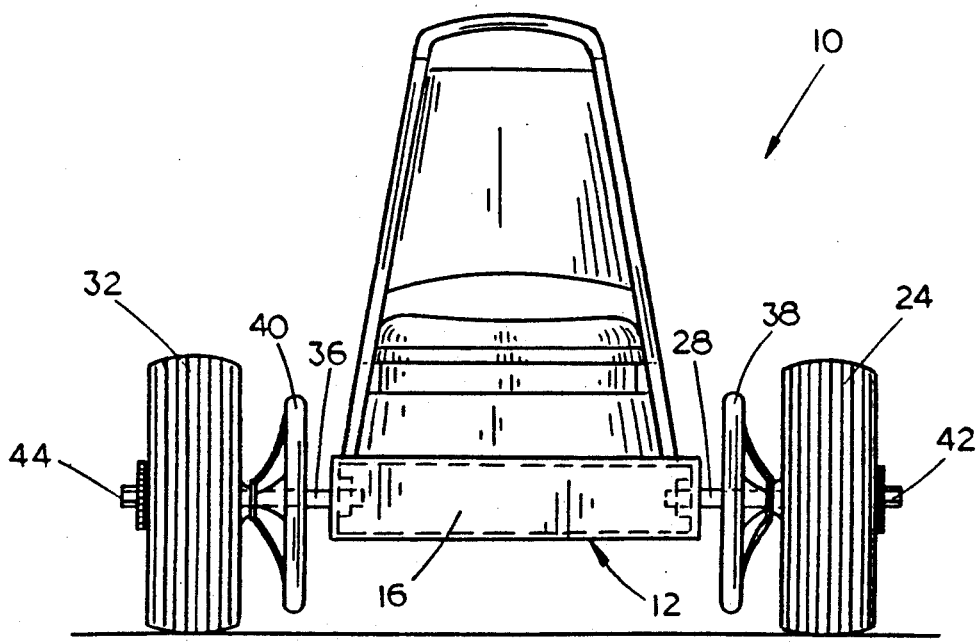
FIG. 4 is a rear elevational view of the wheelchair.

The all-terrain wheelchair of this invention is referred to generally by the reference numeral 10 and comprises a frame means 12 having a forward end 14, rearward end 16, and opposite sides 18 and 20.

Front and rear wheels 22 and 24 are independently, rotatably mounted on frame means 12 at side 18 by means of axles 26 and 28 respectively. Similarly, front and rear wheels 30 and 32 are independently, rotatably mounted on frame means 12 at side 20 by means of axles 34 and 36 respectively. Hand wheels or gripping wheels 38 and 40 are operatively connected to wheels 24 and 32 respectively, between the sides of the frame means and the associated wheels to enable the user of the wheelchair to propel wheels 24 and 32. As seen in the drawings, wheels 22 and 30 are provided with a hexagonal configuration or portion 42 and 44 respectively, each of which are adapted to have a ratchet arm assembly 46 and 48 mounted thereon. It is preferred that the ratchet arm assemblies 46 and 48 always be mounted on the portions 42 and 44 respectively, but the ratchet arm assemblies may be omitted at times if so desired by the user. Sprockets 51 and 52 are operatively connected to wheels 22 and 24 respectively while sprockets 53 and 54 are operatively connected to wheels 30 and 32 respectively. Chain C1 connects sprockets 51 and 52 while chain C2 connects sprockets 53 and 54.

Thus, assuming that the ratchet arm assemblies 46 and 48 are mounted on the wheelchair, the wheels 22 and 24 may be propelled by either the hand wheel 35 or ratchet arm assembly 46. Wheels 30 and 32 may be rotated by either the hand wheel 30 or the ratchet arm assembly 48. Inasmuch as the pair of wheels at one side of the device is independently rotatable with respect to the other pair of wheels, the wheelchair has a very small turning radius, since the wheels at one side of the wheelchair may be rotated in one direction with the wheels at the other side of the wheelchair being rotated in an opposite direction so that the wheelchair may turn about its own axis.

Figure 5:
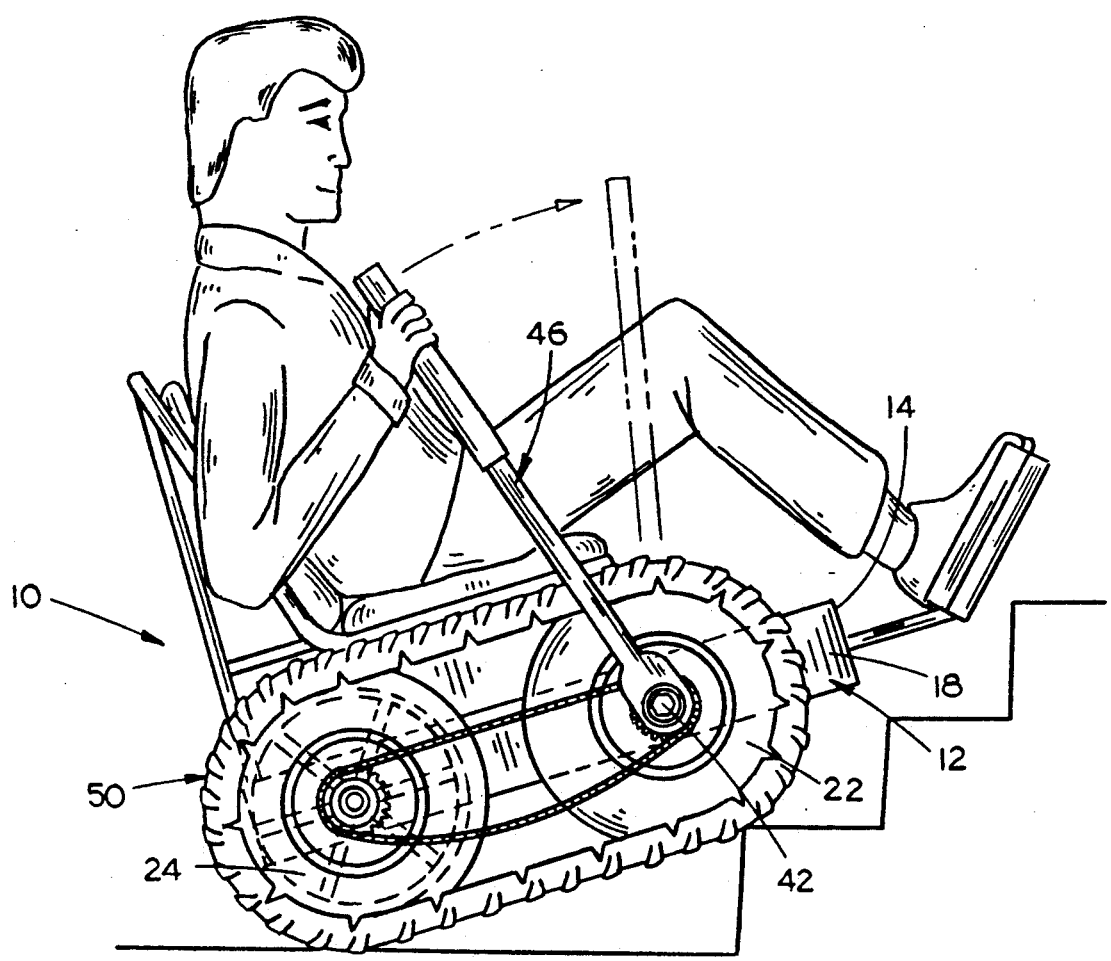
FIG. 5 is a side elevational view of the wheelchair having the ratchet arm assembly secured thereto and the track means mounted thereon.
Figure 6:
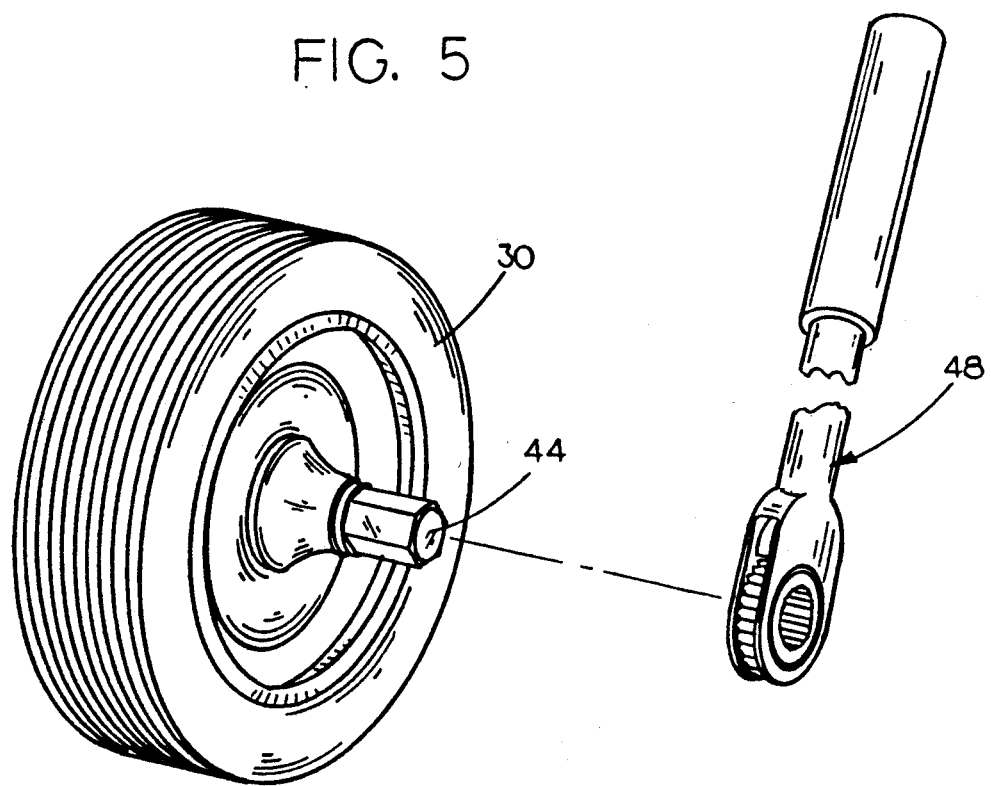
FIG. 6 is perspective view illustrating the relationship of the ratchet arm assembly and one of the front wheels of the wheelchair.
Figure 7:
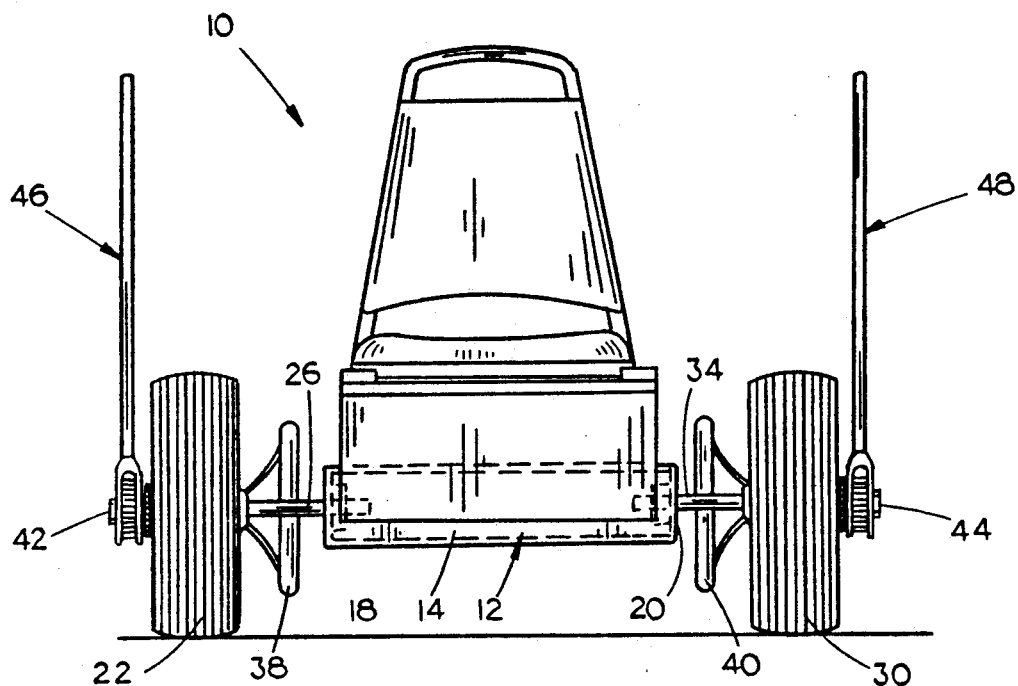
FIG. 7 is a front elevational view of the wheelchair.
Figure 8:
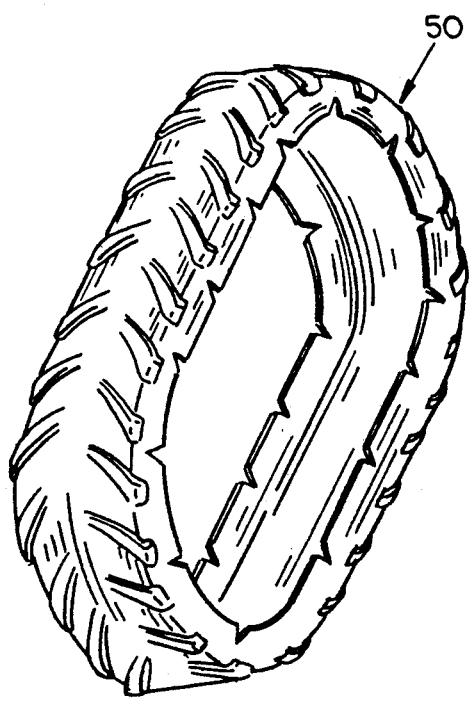
FIG. 8 is a perspective view of one of the track members.
Figure 9:
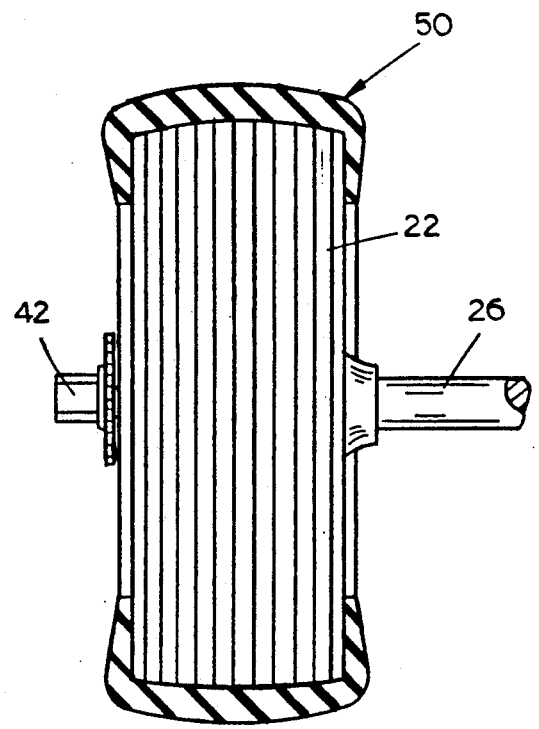
FIG. 9 is a sectional view illustration the relationship of one of the wheels and one of the track members.

The numeral 50 refers to a flexible track member which may be mounted on the wheels at the opposite sides of the wheelchair to enable the wheelchair to traverse extremely rough terrain or to climb stairs as illustrated in FIG. 5. The elongated ratchet arm assemblies 46 and 48 give the user extremely good leverage in applying torque to the front wheels, and hence the back wheels, of the wheelchair so that steep inclines, steps, etc. may be traversed.

Thus it can be seen that the invention accomplishes at least all of its stated objectives.

I claim:

1. An all-terrain wheelchair, comprising,
   a frame means having a forward end, a rearward end, and opposite sides,
   a first pair of wheels, which are normally in ground engagement, rotatably mounted on said frame means at one side thereof comprising a front wheel and a rear wheel,
   a second pair of wheels, which are normally in ground engagement, rotatably mounted on said frame means at the other side thereof comprising a front wheel and a rear wheel,
   a seat means on said frame means for supporting a person thereon,
   a gripping wheel positioned inwardly of each of the said rear wheels and operatively connected thereto whereby the person sitting on said seat means may grasp the same to propel said rear wheels.

2. The wheelchair of claim 1, wherein a first flexible track means extends around said first pair of wheels and wherein a second flexible track means extends around said second pair of wheels, said first and second track means being in ground engagement, rather than said first and second pairs of wheels, when said first and second track means are mounted on said first and second pairs of wheels.

3. The wheelchair of claim 2, wherein said first and second track means are removably mounted on said first and second pairs of wheels.

4. The wheelchair of claim 1, wherein a first chain means operatively interconnects said first pair of wheels and a second chain means operatively interconnects said second pair of wheels.

5. An all-terrain wheelchair, comprising,
   a frame means having a forward end, a rearward end, and opposite sides,
   a first pair of wheels, which are normally in ground engagement, rotatably mounted on said frame means at one side thereof comprising a front wheel and a rear wheel,
   a second pair of wheels, which are normally in ground engagement, rotatably mounted on said frame means at the other side thereof comprising a front wheel and a rear wheel,
   a seat means on said frame means for supporting a person thereon,
   a ratchet means operatively connected to one of said wheels at each side of said frame means and including an elongated actuating arm extending upwardly therefrom at opposite sides of said seat mans whereby the person sitting on said seat means may propel said wheels by selectively reciprocating said actuating arms.

6. The wheelchair of claim 5, wherein a flexible track means extends around each pair of wheels, and wherein said track means is in ground engagement, rather than each pair of wheels, when each of said track means is mounted on each of said pairs of wheels.

7. The wheelchair of claim 5, wherein a gripping wheel is positioned inwardly of each of said rear wheels and being operatively connected thereto whereby the person sitting on the seat means may propel the wheelchair by the actuating arms or the gripping wheels.

8. The wheelchair of claim 5, wherein first and second chains operatively interconnect the wheels of said first and second pairs of wheels respectively.

* * * * *